US008873148B1

(12) United States Patent
Gupta et al.

(10) Patent No.: US 8,873,148 B1
(45) Date of Patent: Oct. 28, 2014

(54) EYEPIECE HAVING TOTAL INTERNAL REFLECTION BASED LIGHT FOLDING

(75) Inventors: Anurag Gupta, Los Gatos, CA (US); Sumit Sharma, San Jose, CA (US)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 13/323,574

(22) Filed: Dec. 12, 2011

(51) Int. Cl.
*G02B 27/14* (2006.01)
*F21V 3/00* (2006.01)

(52) U.S. Cl.
USPC ........... 359/630; 359/629; 359/631; 359/632; 359/633; 359/624; 362/311.01

(58) Field of Classification Search
USPC ................. 359/629–633, 640, 638, 720, 496; 348/53, E5.141, E5.145; 362/311.01
See application file for complete search history.

(56) References Cited

U.S. PATENT DOCUMENTS

| | | | |
|---|---|---|---|
| 4,711,512 A | 12/1987 | Upatnieks | |
| 5,076,664 A | 12/1991 | Migozzi | |
| 5,093,567 A | 3/1992 | Staveley | |
| 5,539,422 A | 7/1996 | Heacock et al. | |
| 5,696,521 A | 12/1997 | Robinson et al. | |
| 5,715,337 A | 2/1998 | Spitzer et al. | |
| 5,771,124 A | 6/1998 | Kintz et al. | |
| 5,815,126 A | 9/1998 | Fan et al. | |
| 5,844,530 A | 12/1998 | Tosaki | |
| 5,886,822 A | 3/1999 | Spitzer | |
| 5,896,232 A | 4/1999 | Budd et al. | |
| 5,926,318 A | 7/1999 | Hebert | |
| 5,943,171 A | 8/1999 | Budd et al. | |
| 5,949,583 A | 9/1999 | Rallison et al. | |
| 6,023,372 A | 2/2000 | Spitzer et al. | |
| 6,091,546 A | 7/2000 | Spitzer | |
| 6,172,657 B1 | 1/2001 | Kamakura et al. | |
| 6,201,629 B1 | 3/2001 | McClelland et al. | |
| 6,204,974 B1 | 3/2001 | Spitzer | |

(Continued)

FOREIGN PATENT DOCUMENTS

| | | |
|---|---|---|
| GB | 2272980 A | 6/1994 |
| WO | WO96/05533 A1 | 2/1996 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Scott J Sugarman
*Assistant Examiner* — Mustak Choudhury
(74) *Attorney, Agent, or Firm* — Blakely Sokoloff Taylor & Zafman LLP

(57) ABSTRACT

An eyepiece for a head mounted display includes a light relay body, a total internal reflection ("TIR") interface, and a focusing lens. The light relay body has a first end coupled to receive CGI light from an image source and a second end including a viewing region from which the CGI light is emitted. The TIR interface is disposed in the viewing region at an oblique angle relative to an eye-ward side of the light relay body through which the CGI light is emitted from the eyepiece. The TIR interface is oriented to redirect the light towards the eye-ward side of the light relay body. The focusing lens is disposed along the eye-ward side of the light relay body in alignment with the TIR interface to bring the CGI light into focus for a near-to-eye arrangement.

18 Claims, 5 Drawing Sheets

(56) References Cited

U.S. PATENT DOCUMENTS

| | | |
|---|---|---|
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 * | 5/2002 | Spitzer ............... 359/630 |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 8,004,765 B2 | 8/2011 | Amitai |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2007/0091445 A1 * | 4/2007 | Amitai ............... 359/630 |
| 2008/0219025 A1 | 9/2008 | Spitzer et al. |
| 2009/0015929 A1 * | 1/2009 | DeJong et al. ............... 359/633 |
| 2009/0122414 A1 | 5/2009 | Amitai |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2011/0164294 A1 * | 7/2011 | Shimizu ............... 359/13 |
| 2011/0213664 A1 | 9/2011 | Osterhout et al. |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

* cited by examiner

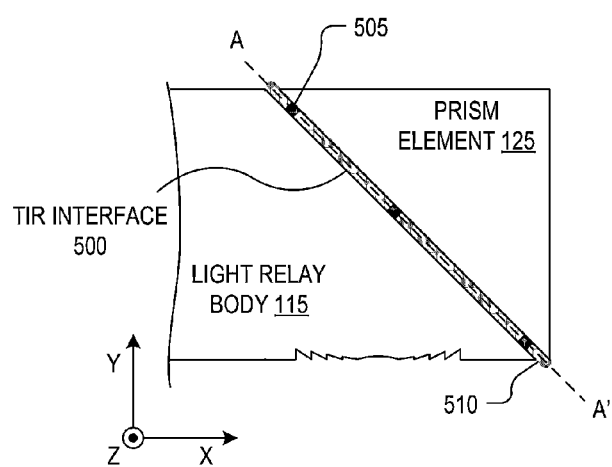
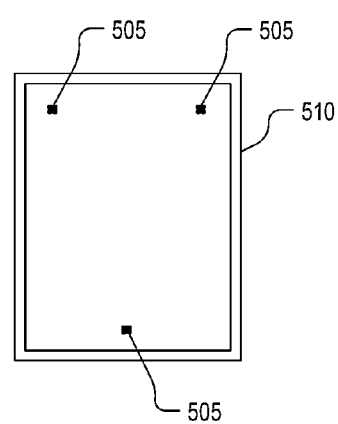
FIG. 5A
FIG. 5B
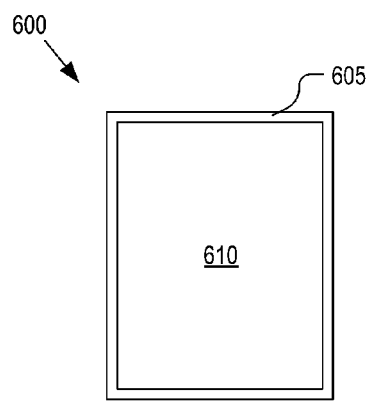
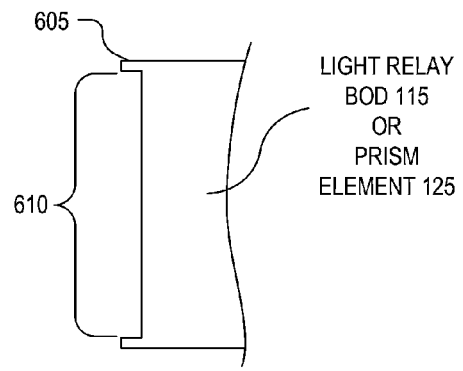
FIG. 6A
FIG. 6B

US 8,873,148 B1

EYEPIECE HAVING TOTAL INTERNAL REFLECTION BASED LIGHT FOLDING

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI. HMDs are also referred to as heads-up displays ("HUDs").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily drawn to scale.

FIGS. 5A & 5B illustrate a first implementation of the TIR interface, in accordance with an embodiment of the disclosure.

FIGS. 6A & 6B illustrate a second implementation of the TIR interface, in accordance with an embodiment of the disclosure.

DETAILED DESCRIPTION

Embodiments of an apparatus and method of operation of an eyepiece for a head mounted display that uses total internal reflection ("TIR") based light folding are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
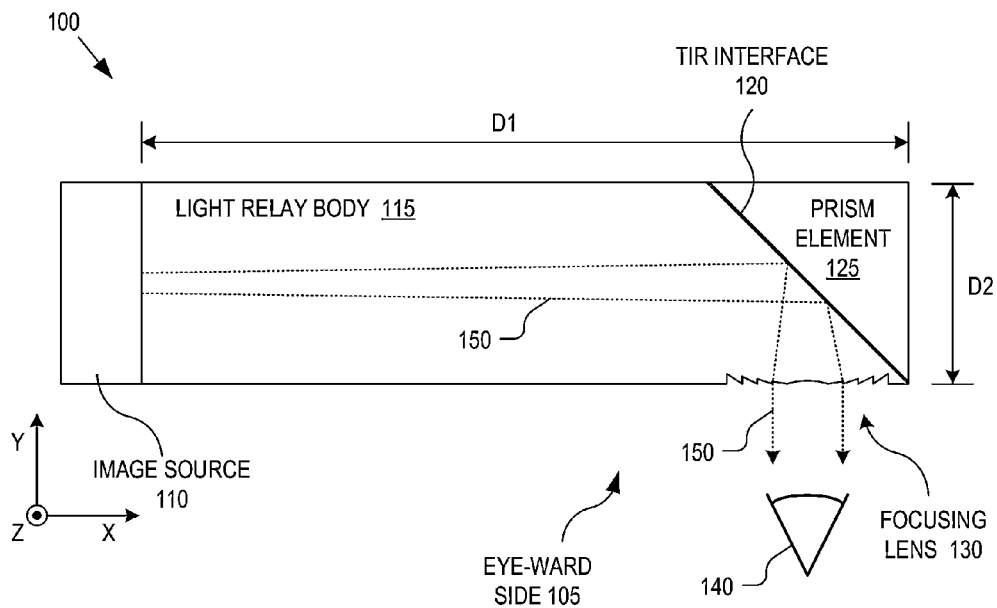
FIG. 1A is a top view of an eyepiece including a total internal reflection ("TIR") interface in the viewing region, in accordance with an embodiment of the disclosure.
Figure 1B:
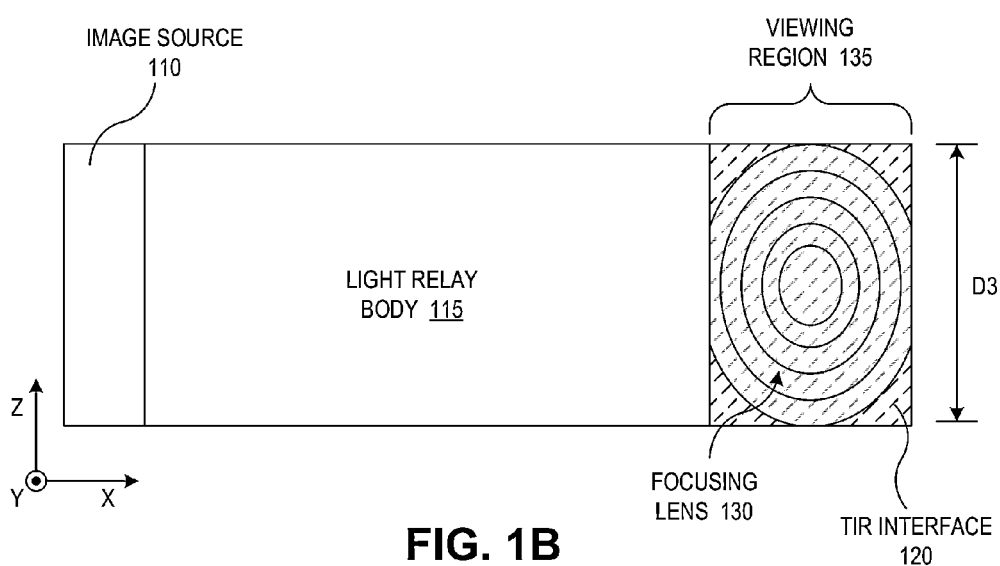
FIG. 1B is a side view of the eyepiece including the TIR interface in the viewing region, in accordance with an embodiment of the disclosure.

FIGS. 1A and 1B illustrate an eyepiece 100, in accordance with an embodiment of the disclosure. FIG. 1A is a top view of eyepiece 100 while FIG. 1B is a side view of eye-ward side 105 of eyepiece 100. The illustrated embodiment of eyepiece 100 includes an image source 110, a light relay body 115, a total internal reflection ("TIR") interface 120, a prism element 125, and a focusing lens 130. TIR interface 120 and focusing lens 130 are disposed within a viewing region 135 of eyepiece 100, which is to be aligned with a user's eye 140 when packaged into a head mounted display ("HMD") and worn by the user.

In one embodiment, light relay body 115 is a single solid element having a substantially rectangular cross-sectional shape. For example, light relay body 115 may have the following approximate dimensions: D1=30 mm, D2=10 mm, D3=10 mm; however, other dimensions may be implemented. Light relay body 115 is fabricated of a substantially transparent material, such optical grade plastic (e.g., acrylic, PMMA, Zeonex-E48R, etc.), molded glass (e.g., fused silica), or otherwise. Light relay body 115 provides an optical path through which the computer generated image ("CGI") light 150 travels from image source 110 to TIR interface 120. In the illustrated embodiment, light relay body 115 is formed with sides having substantially right angles to each other, with the exception of an oblique side that forms TIR interface 120 with prism element 125. Light relay body 115 provides a mechanical support to which the other components of eyepiece 100 mount and protects the optical path of CGI light 150 from obstructions; however, the illustrated embodiment of light relay body 115 does not guide CGI light 150 via TIR, except for its oblique side at TIR interface 120.

Eyepiece 100 includes viewing region 135, which is intended to be aligned to direct CGI light 150 to eye 140 of the user. Viewing region 135 includes TIR interface 120, formed as a gap between the oblique side portion of light relay body 115 and prism element 125. Prism element 125 may be implemented with the same or different material as light relay body 115, but having a substantially wedge shape with an oblique surface that mates to the oblique surface of light relay body 115. Prism element 125 may be fabricated of a transparent, semi-transparent, or even opaque material. However, when fabricated of a transparent material, similar to light relay body 115, desirable industrial design characteristics may be achieved. For example, while TIR interface 120 operates to fold CGI light 150 into eye 150, it would also operate to reflect external light incident upon the opposite side of TIR interface 120 through prism element 125. If prism element 125 (and light relay body 115) have a higher index of refraction than the gap at TIR interface 120 between these two mated structures, then TIR interface 120 operates to block external light from mixing with CGI light 150 folded into eye 140 without having to paint or introduce a backside black or otherwise opaque surface that is less aesthetically pleasing. Thus, in one embodiment, light relay body 115 and prism element 125 are both fabricated of a transparent material having a higher index of refraction than air.

Viewing region 135 further includes focusing lens 130 disposed in or on eye-ward side 105 of light relay body 115. Focusing lens 130 operates to bring CGI light 150 into focus for a near-to-eye arrangement (e.g., when eye-ward side 105 is positioned within 10 cm of eye 140 and typically within 3 to 5 cm of eye 140). Focusing lens 130 operates to reduce the divergence of the light rays of CGI light 150. In one embodiment, focusing lens 130 operates to position the image formed by CGI light 150 at or near infinity, though substantially shorter image distances may also be used (e.g., 1 to 3 meters). Focusing lens 130 may be integrally fabricated into the side surface of light relay body 115 (illustrated) or fused/mounted to the side surface. In the illustrated embodiment, focusing lens 130 is implemented as a Fresnel lens molded into light relay body 115 on eye-ward side 105 within viewing region 135. Light relay body 115 and focusing lens 130 may be jointly fabricated using injection molded techniques.

Figure 2:
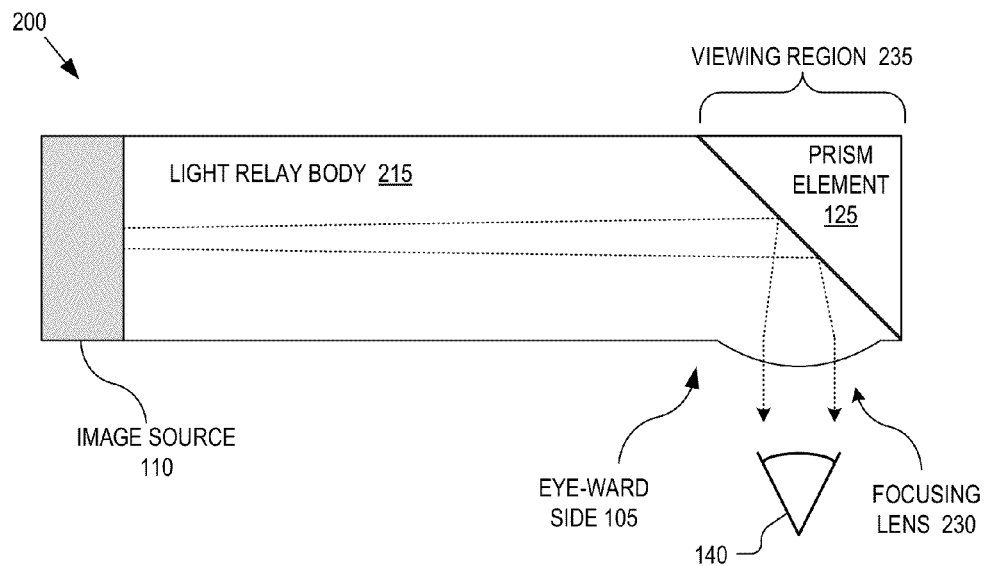
FIG. 2 is a top view of an eyepiece including a TIR interface and a refractive focusing lens disposed on the eye-ward side of the eyepiece in the viewing region, in accordance with an embodiment of the disclosure.
Figure 3:
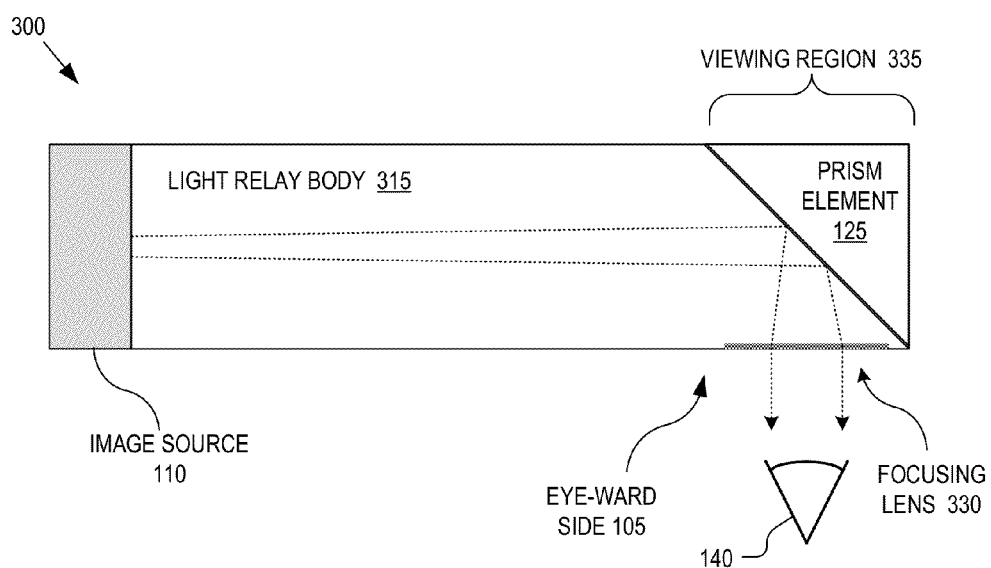
FIG. 3 is a top view of an eyepiece including a TIR interface and a diffractive optical element disposed on the eye-ward side of the eyepiece in the viewing region, in accordance with an embodiment of the disclosure.

Focusing element 130 may be fabricated using other types of lens structures. For example, FIG. 2 illustrates an eyepiece 200 having a light relay body 215 with a focusing lens 230 implemented as a molded-in refractive element. Alternatively, a refractive lens could be bonded to eye-ward side 105 within viewing region 235. FIG. 3 illustrates an eyepiece 300 having a light relay body 315 with a focusing lens 330 implemented using a diffractive optical element (e.g., diffraction grating, hybrid diffractive element, etc.). The diffractive optical element may be embedded within light relay body 315, bonded to eye-ward side 105, or etched into eye-ward side 105 within viewing region 335. Of course, other types/combinations of focusing lenses may be used to implement focusing lens 130.

Figure 4:
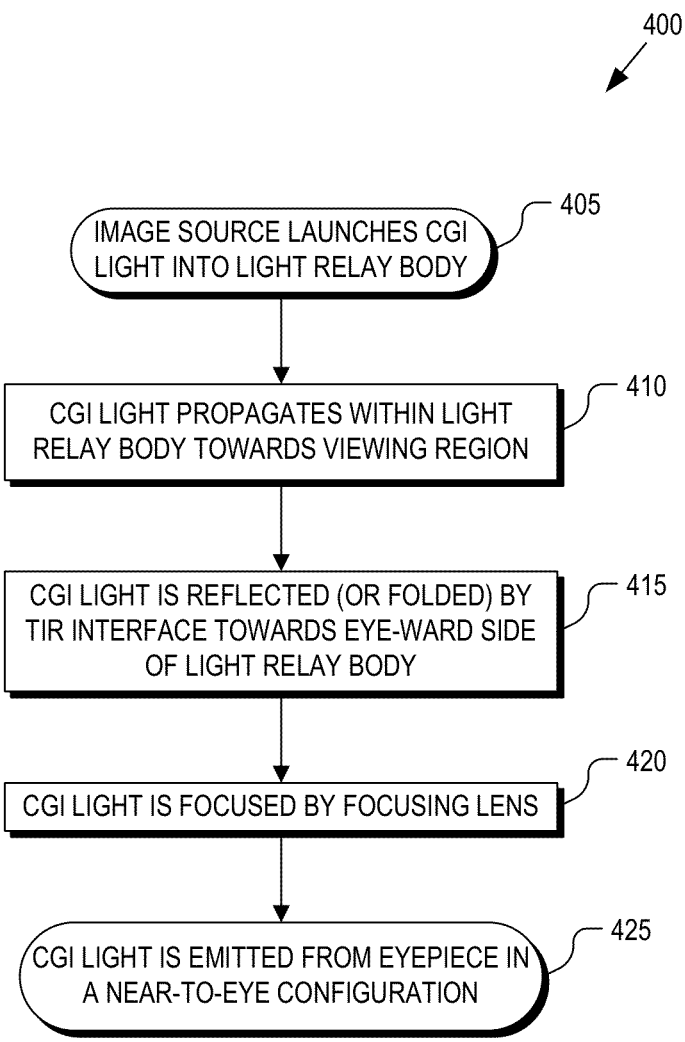
FIG. 4 is a flow charting illustrating a process of operation of the eyepiece, in accordance with an embodiment of the disclosure.

FIG. 4 is a flow charting illustrating a process 400 of operation of eyepiece 100, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, image source 110 launches CGI light 150 into light relay body 115. Image source 110 may couple to and be driven by a graphics engine for rendering computer generated images. Image source 110 may be implemented using a variety of display technologies, including a back-lit liquid crystal display ("LCD"), a monochrome or multi-color light emitting diode ("LED") array, a quantum dot array, an organic LED ("OLED"), or otherwise. In the illustrated embodiment, image source 110 is directly butt coupled to the end of light relay body 115. In other embodiments, various other optical elements may be interposed between an emission aperture of image source 110 and light relay body 115, such as focusing optics (e.g., brightness enhancement film), an anti-reflective coating, a polarizing film, a light cone perimeter confining blackout aperture, or otherwise.

In a process block 410, CGI light 150 propagates within light relay body 115 towards viewing region 135. Light relay body 115 provides rigid mechanical body to support the various optical components and protects the light path between image source 110 and viewing region 135 from obstruction. However, light relay body 115 merely relays CGI light 150 between image source 110 and viewing region 135 without necessity of guiding it via TIR offset its sidewalls (with the exception of light folding at TIR interface 120).

In a process block 415, CGI light 150 reaches TIR interface 120, at which point it is reflected or otherwise folded towards eye-ward side 105. TIR interface 120 uses TIR due to a change in the index of refraction at the interface between light relay body 115 and prism element 125 (discussed in greater detail in connection with FIGS. 5A, 5B, 6A, and 6B). Since TIR is used to redirect CGI light 150, aesthetically unpleasing opaque, reflective coatings at the light folding surface are not necessary. Thus, a user wearing eyepiece 100 will not have an unattractive blackout surface in front of his eye. In some embodiments, TIR interface 120 is implemented using a gap (e.g., air gap) fabricated between light relay body 115 and prism element 125. Thus, eyepiece 100 could operate without inclusion of prism element 125, and indeed, embodiments without prism element 125 are expressly contemplated herein; however, prism element 125 can serve a number of beneficial purposes. Prism element 125 flattens out the oblique end surface of light relay body 115 thereby improving eye-safety characteristics and provides a rectangular industrial design to eyepiece 100.

After folding CGI light 150 to redirect it towards the user's eye 140, CGI light 150 is focused by focusing lens 130 (process block 420). As mentioned above, focusing lens 130 permits the user to bring CGI light 150 into focus when used in a near-to-eye configuration. In one embodiment, focusing lens 130 collimates or nearly collimates CGI light 150. Finally, in process block 425, CGI light 150 is emitted out viewing region 135 of eyepiece 100 towards eye 140.

FIGS. 5 and 6 illustrate two example implementations of TIR interface 120. FIGS. 5A & 5B illustrate a first implementation of a TIR interface 500 that uses standoffs 505 and a perimeter seal 510, in accordance with an embodiment of the disclosure. FIG. 5A is a top view of a viewing region of an eyepiece, while FIG. 5B is a cross-sectional view along ling A-A' from FIG. 5A. TIR interface 500 is formed by the gap created by standoffs 505 disposed at the interface between light relay body 115 and prism element 125. Standoffs 505 separate the oblique planar surface of light relay body 115 from the oblique planar surface of prism element 125 by an amount generally greater than 1 μm, such as, for example, 2-4 μm, though even greater offsets may be used. Standoffs 505 may be separate independent material (e.g., glue drops) positioned between light relay body 115 and prism element 125 during assembly, or may be nubs or pads etched out of (or integrally molded therewith) one or both of the mechanical bodies of light relay body 115 or prism element 125. The illustrated embodiment of TIR interface 500 uses three standoffs 505 arranged in a triangular pattern; however, more than three standoffs 505 arranged in other patterns may also be used. Once light relay body 115 is aligned with prism element 125, perimeter seal 510 may be applied to seal the gap (e.g., air gap) to prevent contaminants from fouling TIR interface 500 and may also serve as a mechanical bond for holding the two components together.

FIGS. 6A & 6B illustrate a second implementation of a TIR interface 600 that uses a raised perimeter ridge 605 and a recess cavity 610, in accordance with an embodiment of the disclosure. FIG. 6A illustrates a direct on view of the oblique surface on either light relay body 115 or prism element 125, while FIG. 6B illustrates a cross-sectional side view along the oblique surface. Raised perimeter ridge 605 can be disposed on one (or even both) oblique surface of either light relay body 115 or prism element 125 and operates to create recess cavity 610, thereby forming a gap (e.g., air gap) at TIR interface 600. Raised perimeter ridge 605 should be greater than 1 μm in height, such as, for example, 2-4 μm high, though an even higher ridge may be used. If raised perimeter ridge 605 is formed on just a single oblique surface, then the opposing surface may simply remain flat without a ridge. Glue may be used to seal raised perimeter ridge 605 to the opposing oblique surface on either light relay body 115 or prism element 125.

Figure 7:
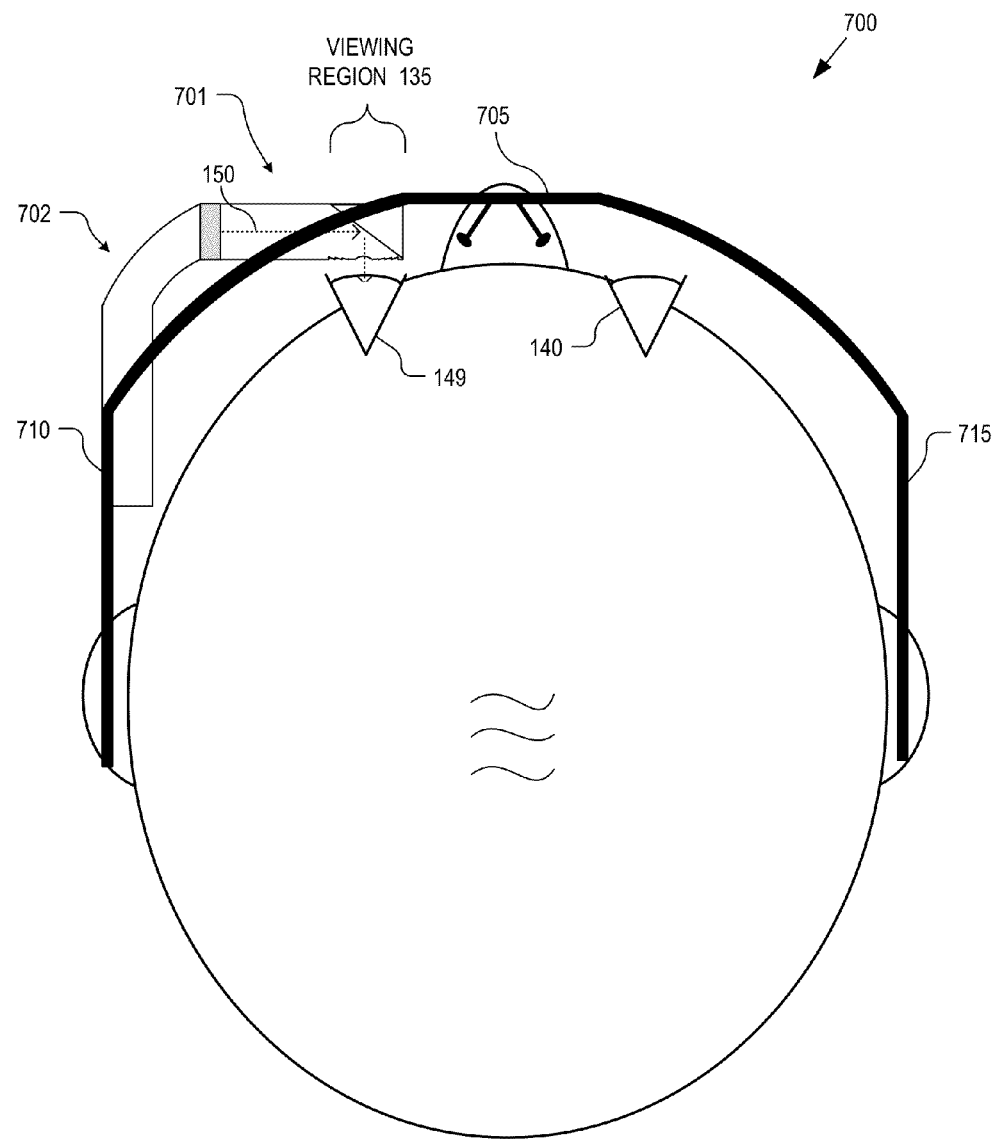
FIG. 7 is a top view of a monocular HMD implemented with an eyepiece having a TIR interface in the viewing region, in accordance with an embodiment of the disclosure.

FIG. 7 is a top view of a head mounted display ("HMD") 700 using an eyepiece 701, in accordance with an embodiment of the disclosure. Eyepiece 701 may be implemented with embodiments of eyepiece 100, 200, or 300. Eyepiece 701 is mounted to a frame assembly, which includes a nose bridge 705, left ear arm 710, and right ear arm 715. An electronics housing 702 is further coupled to eyepiece 701 and may include a CGI engine for driving the image source and other circuitry. Although FIG. 7 illustrates a monocular embodiment, HMD 700 may also be implemented as a binocular HMD using a pair of eyepieces 701, one for each eye.

Eyepiece 701 is secured into an eye glass arrangement that can be worn on the head of a user. The left and right ear arms 710 and 715 rest over the user's ears while nose assembly 705 rests over the user's nose. The frame assembly is shaped and sized to position viewing region 135 in front of a corresponding eye 140 of the user. Of course, other frame assemblies having other shapes may be used (e.g., a visor with ear arms and a nose bridge support, a single contiguous headset member, a headband, or goggles type eyewear, etc.).

The illustrated embodiment of HMD 700 is capable of displaying a heads-up display to the user. In one embodiment, the viewing region of eyepiece 701 is positioned to be slightly above the user's central forward vision so as not to completely block the user's real world view. In another embodiment, the viewing region may be centrally positioned in front of the user's vision to provide a fully immersive virtual reality display. Left and right (binocular embodiment) CGI light 150 may be generated by one or two CGI engines (not illustrated) coupled to a respective image source of a pair of eyepieces. CGI light 150 is seen by the user as a private virtual reality or heads up display.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head mounted display, the eyepiece comprising:
    a light relay body having a first end coupled to receive computer generated image ("CGI") light from an image source and a second end including a viewing region from which the CGI light is emitted, wherein the light relay body includes a first oblique side;
    a total internal reflection ("TIR") interface disposed in the viewing region at an oblique angle relative to an eye-ward side of the light relay body through which the CGI light is emitted from the eyepiece, the TIR interface oriented to redirect the light towards the eye-ward side of the light relay body;
    a focusing lens disposed along the eye-ward side of the light relay body in alignment with the TIR interface to bring the CGI light into focus for a near-to-eye arrangement; and
    a prism element having a second oblique side that mates to the first oblique side of the light relay body,
    wherein the TIR interface comprises a gap between the first and second oblique sides of the light relay body and the prism element, respectively,
    wherein the gap between the first and second oblique sides is formed by three standoffs disposed between the first and second oblique sides in a triangular pattern.

2. The eyepiece of claim 1, wherein the light relay body comprises a single solid element having the first oblique side.

3. The eyepiece of claim 2, wherein the focusing lens comprises a Fresnel lens molded into the light relay body on the eye-ward side.

4. The eyepiece of claim 3, wherein the light relay body and the focusing lens comprise an injection molded plastic piece.

5. The eyepiece of claim 1, wherein the gap is sealed around a perimeter of the first and second oblique sides to prevent dust from entering into the gap.

6. The eyepiece of claim 1, wherein the image source comprises one of an organic light emitting diode ("OLED") or a liquid crystal display ("LCD") with a backlight, and wherein an emission aperture of the image source is mounted to an end surface of the light relay body.

7. The eyepiece of claim 1, wherein the focusing lens comprises a hybrid diffractive optical element.

8. The eyepiece of claim 1, wherein the focusing lens comprises a refractive optical element.

9. The eyepiece of claim 8, wherein the refractive optical element is molded into the eye-ward side of the eyepiece.

10. An eyepiece for a head mounted display, the eyepiece comprising:
    a light relay body having a first end coupled to receive computer generated image ("CGI") light from an image source and a second end including a viewing region from which the CGI light is emitted, wherein the light relay body includes a first oblique side;
    a total internal reflection ("TIR") interface disposed in the viewing region at an oblique angle relative to an eye-ward side of the light relay body through which the CGI light is emitted from the eyepiece, the TIR interface oriented to redirect the light towards the eye-ward side of the light relay body;
    a focusing lens disposed along the eye-ward side of the light relay body in alignment with the TIR interface to bring the CGI light into focus for a near-to-eye arrangement; and
    a prism element having a second oblique side that mates to the first oblique side of the light relay body, wherein the TIR interface comprises a gap between the first and second oblique sides of the light relay body and the prism element, respectively, wherein the gap is formed by a raised perimeter ridge and a recess cavity disposed in at least one of the first or second oblique sides.

11. A head mounted display ("HMD") for displaying computer generated image ("CGI") light to a user, the HMD comprising:

an eyepiece including:
- an image source for launching computer generated image ("CGI") light;
- a light relay body having a first end coupled to receive the CGI light from the image source and a second end including a viewing region from which the CGI light is emitted, wherein the light relay body includes a first oblique side;
- a total internal reflection ("TIR") interface disposed in the viewing region at an oblique angle relative to an eye-ward side of the light relay body through which the CGI light is emitted from the eyepiece, the TIR interface oriented to redirect the light towards the eye-ward side of the light relay body;
- a prism element having a second oblique side that mates to the first oblique side of the light relay body; and
- a focusing lens disposed along the eye-ward side of the light relay body in alignment with the TIR interface to bring the CGI light into focus for a near-to-eye arrangement; and a frame assembly to support the eyepiece for wearing on a head of the user with the viewing region positioned in front of an eye of the user, wherein the TIR interface comprises a gap between the first and second oblique sides of the light relay body and the prism element, respectively, wherein the gap is formed by a raised perimeter ridge and a recess cavity disposed in at least one of the first or second oblique sides.

12. The HMD of claim 11, wherein the light relay body comprises a single solid element having the first oblique side forming the TIR interface.

13. The HMD of claim 12, wherein the focusing lens comprises a Fresnel lens molded into the light relay body on the eye-ward side.

14. The HMD of claim 13, wherein the light relay body and the focusing lens comprise an injection molded plastic piece.

15. The HMD of claim 11, wherein the image source comprises one of an organic light emitting diode ("OLED") or a liquid crystal display ("LCD") with a backlight.

16. The HMD of claim 11, wherein the focusing lens comprises a hybrid diffractive optical element.

17. The HMD of claim 11, wherein the focusing lens comprises a refractive optical element.

18. The HMD of claim 17, wherein the refractive optical element is molded into the eye-ward side of the eyepiece.

* * * * *